(12) United States Patent
Disney et al.

(10) Patent No.: US 11,790,083 B2
(45) Date of Patent: Oct. 17, 2023

(54) DETECTING MALICIOUS SCRIPTS IN A WEB PAGE

(71) Applicant: Shape Security, Inc., Santa Clara, CA (US)

(72) Inventors: Tim Disney, Santa Clara, CA (US); Madhukar Kedlaya, Sunnyvale, CA (US); Claire Schlenker Schlenker, Redwood City, CA (US); Nitish Khadke, Mountain View, CA (US)

(73) Assignee: SHAPE SECURITY, INC., Seattle, WA (US)

( * ) Notice: Subject to any disclaimer, the term of this patent is extended or adjusted under 35 U.S.C. 154(b) by 204 days.

(21) Appl. No.: 16/914,183

(22) Filed: Jun. 26, 2020

(65) Prior Publication Data

US 2021/0406370 A1 Dec. 30, 2021

(51) Int. Cl.
*G06F 21/56* (2013.01)
*G06F 21/55* (2013.01)
*H04L 67/02* (2022.01)

(52) U.S. Cl.
CPC .......... *G06F 21/563* (2013.01); *G06F 21/554* (2013.01); *G06F 21/568* (2013.01); *H04L 67/02* (2013.01)

(58) Field of Classification Search
CPC ..... G06F 21/563; G06F 21/554; G06F 21/568
See application file for complete search history.

(56) References Cited

U.S. PATENT DOCUMENTS

| 10,075,456 B1* | 9/2018 | Morparia | H04L 63/1425 |
| 2015/0082440 A1* | 3/2015 | Pickett | H04L 63/145 |
| | | | 726/24 |

OTHER PUBLICATIONS

International Search Report and Written Opinion of the International Searching Authority, dated Sep. 15, 2021.
International Preliminary Report on Patentability for PCT/US2021/037041, dated Dec. 13, 2022.

* cited by examiner

*Primary Examiner* — Nelson S. Giddins
(74) *Attorney, Agent, or Firm* — Troutman Pepper Hamilton Sanders LLP (F5 PATENTS)

(57) ABSTRACT

Techniques are provided for detecting a malicious script in a web page. Instrumentation code is provided for serving to a client computing device with a web page. The instrumentation code is configured to monitor web code execution at the client computing device when a script referenced by the web page is processed. Script activity data generated by the instrumentation code is received. The script activity data describes one or more script actions detected by the instrumentation code at the client computing device. Prior script activity data generated by a prior instance of the instrumentation code is obtained. A malicious change in the script is detected based on comparing the script activity data and the prior script activity data. In response to detecting the malicious change in the script, a threat response action is performed.

20 Claims, 5 Drawing Sheets

DETECTING MALICIOUS SCRIPTS IN A WEB PAGE

FIELD OF THE DISCLOSURE

The present disclosure generally relates to web security, and relates more specifically to detecting malicious scripts in a web page.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Web servers host and serve web pages to users. The web pages may include web code that executes at client computing devices. Attackers may gain access to sensitive information by causing malicious web code to execute at the client computing devices. For example, an attacker can insert malicious web code into a web page hosted at a web server, causing the web server to serve compromised web pages. The malicious web code may be provided to users along with legitimate content corresponding to the web page.

A user may visit a trusted web site and download the malicious web code if a web page at the trusted web site is compromised. Such malicious code may gather data in one or more objects defined in the web page, load and run additional malicious web code, and/or exfiltrates sensitive data. For example, when the user enters authentication information and/or credit card information in a browser displaying the web page, the malicious web code may gather and forward the information to a server under control of the attacker. Such activity may occur without being detectable by a typical user.

When a web page is processed at a browser, the browser may also load other resources indicated by the web page. Such resources may include third-party web code for advertising, trackers, social media, or other functionality. The third-party web code may also be compromised by attackers, causing malicious web code to execute at the client computing device. Web server administrators may wish to protect their users from such malicious attacks.

SUMMARY

The appended claims may serve as a summary.

While each of the figures illustrate a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other, and does not imply an ordering, timing, or any other characteristic of the referenced items unless otherwise specified; the term "and/or" as used herein refers to and encompasses any and all possible combinations of one or more of the associated listed items; that the terms "comprises" and/or "comprising" specify the presence of stated features, but do not preclude the presence or addition of one or more other features.

A "computer system" refers to one or more computers, such as one or more physical computers, virtual computers, and/or computing devices. For example, a computer system may be, or may include, one or more server computers, desktop computers, laptop computers, mobile devices, special-purpose computing devices with a processor, cloud-based computers, cloud-based cluster of computers, virtual machine instances, and/or other computing devices. A system may include another system, and computers may belong to two or more systems. Any reference to a "computer system" may mean one or more computers, unless expressly stated otherwise. When a computer system performs an action, the action is performed by one or more computers of the computer system.

A "client" refers to a combination of integrated software components and an allocation of computational resources, such as memory, a computing device, and/or processes on a computing device for executing the integrated software components. The combination of the software and computational resources are configured to interact with one or more servers over a network, such as the Internet. A client may refer to either the combination of components on one or more computers, or the one or more computers (also referred to as "client computing devices").

A "server" refers to a combination of integrated software components and an allocation of computational resources, such as memory, a computing device, and/or processes on the computing device for executing the integrated software components. The combination of the software and computational resources are dedicated to providing a particular type of function on behalf of clients of the server. A server may refer to either the combination of components on one or more computing devices, or the one or more computing devices (also referred to as "server system"). A server system may include multiple servers; that is, a server system may include a first server system and a second server system on one or more computing devices, which may provide the same or different functionality to the same or different set of clients.

General Overview

This document generally describes systems, methods, devices, and other techniques for detecting malicious scripts. A security server system provides instrumentation code for serving to a client computing device with a requested web page. The instrumentation code collects script activity data when one or more scripts referenced in the web page execute at the client computing device. The security server system analyzes the script activity data collected by the instrumentation code to determine whether the web page has loaded a malicious script.

The script activity data may describe one or more script actions that have the potential to collect sensitive data and/or transmit sensitive data to a third-party server system. In some embodiments, the security server system determines that a script is malicious based on determining that the script has started to perform new actions that it previously did not perform. The security server system may compare script activity data collected from the web page with prior script activity data generated by one or more prior instances of the instrumentation code that previously executed at one or more other client computing devices that requested the web page.

The security server system may perform a threat response action when the security server system detects a malicious script in the web page. For example, the security server system may notify a publisher of the web page that its web page is compromised. In some embodiments, the security server system provides threat response code for serving with the web page. The threat response code may perform a blocking action on a malicious script to prevent the malicious script from performing one or more actions. For example, the threat response code may block the malicious script from loading, block the script from using one or more Web API interfaces that provide access to sensitive data, block the script from accessing one or more elements of the web page containing sensitive data, and/or block the script from initiating one or more outbound network requests from the client computing device/s.

In some implementations, the various techniques described herein may achieve one or more of the following advantages: an owner of a web server system may better protect its users and itself from fraudsters; the protection may be provided relatively simply for the web server system in certain implementations, such as by using a security service that monitors hosted web pages using the techniques described herein to detect a malicious script in a web page; the security service can be provided flexibly by an organization that specializes in web security, which can keep the functionality updated to address ever-changing security threats; such a security organization can also aggregate data received from multiple web server systems across many clients that operate many domains, and can use that aggregated information to generate countermeasures that are more effective than countermeasures that could be developed using only data from a single domain. Additional features and advantages are apparent from the specification and the drawings.

System Overview

Figure 1:
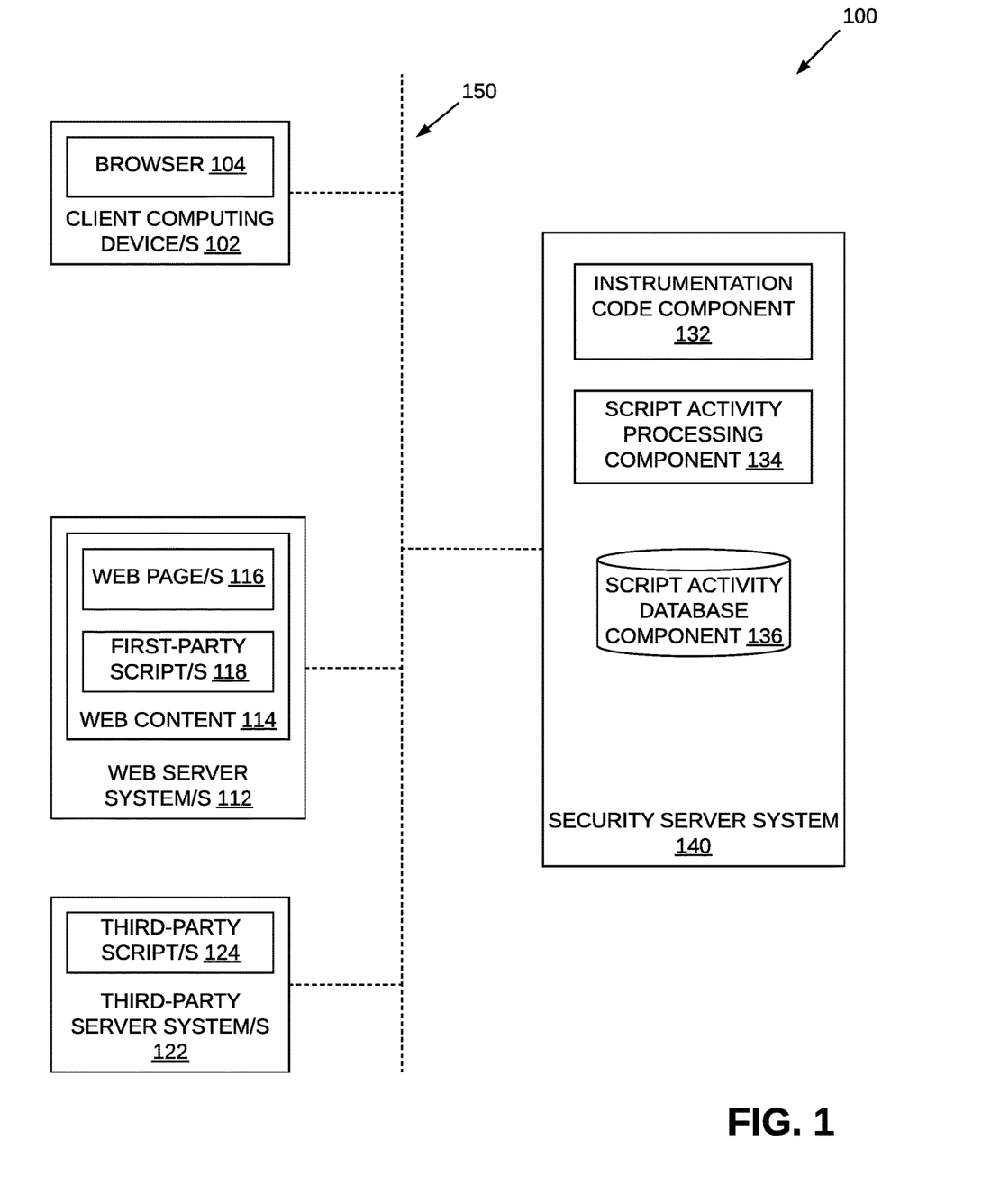
FIG. 1 illustrates a computer system that includes a security server system in an example embodiment.

FIG. 1 illustrates a computer system that includes a security server system in an example embodiment. The computer system 100 includes a client computing device 102, a web server system 112, a third-party server system 122, and a security server system 140. The client computing device 102, the web server system 112, the third-party server system 122, and the security server system 140 communicate over one or more networks 150. The network/s 150 may include one or more local area networks (LANs) and/or one or more wide area networks, such as the Internet.

The web server system 112 hosts web content 114, making the web content 114 available to the client computing device 102 over the network 150. The web content 114 may include one or more web pages 116, images, audio, video, messages, files, data, scripts, services, application content, and other content available over the network/s 150. A web page 116 hosted by the web server system 112 may include one or more sets of instructions or data, such as HTML, CSS, or JavaScript.

The web server system 112 may provide the web page 116 in response to a request from the client computing device 102. For example, a browser 104 executing on the client computing device 102 may request the web page 116 over the network/s 150. As used herein, the term "browser" refers to any client application that can locate, retrieve, and present content from the World Wide Web. The browser 104 processes the instructions and/or data in the web page 116. The browser 104 may be a stand-alone browser application, a native application on a computing device such as but not limited to a mobile computing device, an in-app browser that is integrated into another application, a web crawler application, a headless browser, other automated bots and/or other automated software, and any other software application with browser functionality.

Some embodiments are described herein with respect to one client computing device 102 and one web server system 112 for ease of explanation. A security server system 140 may provide security functionality for multiple web server systems 112, and a web server system 112 may host web content 114 accessible by multiple client computing devices 102 without departing from the spirit and the scope of the disclosure.

Scripts

The web content 114 hosted by the web server system 112 may include a web page 116 that refers to one or more first-party scripts 118 and/or third-party scripts 124. A script, such as a first party script 118 and/or a third-party script 124, includes web code that executes at the client computing device 102 when the browser 104 processes the web page 116. As used herein, the term "web code" refers to instructions in a programming language that are executed within a browser 104. A web page 116 may contain web code and/or refer to another document containing web code, such as a first-party script 118 and/or a third-party script 124. For example, the web page 116 may include a reference to a first-party script 118 hosted by the web server system 112, and/or a reference to a third-party script 124 hosted by a third-party server system 122. When the browser 104 processes the web page 116, the browser 104 uses the reference to the corresponding script to obtain and execute the script (e.g. first-party script 118, third-party script 124). In some embodiments, the script 124 is a JavaScript (JS) script. The JS script may be added to the web page 116 by specifying a Uniform Resource Locator (URL) of the JS script using a script tag in the HTML document for the web page 116. When the browser 104 processes the script tag, the browser 104 requests the script using the URL.

A first-party script 118 and/or a third-party script 124 may include legitimate web code that the publisher of the web content 114 intentionally adds to the web page 116. For example, legitimate web code may add functionality related to advertisement, analytics, networking, communication, widgets, and other tools that enhance the web page 116 for the publisher and/or the user.

A first-party script 118 and/or a third-party script 124 may also include malicious web code. For example, when executed by the browser 104, the malicious web code in a malicious script may exfiltrate sensitive data, such as login credentials and/or financial data. When a user enters sensitive data while interacting with the web page 116 at the client computing device 102, the malicious web code loaded with the web page 116 may have access to the sensitive data.

Malicious web code may appear in a first-party script 118 and/or a third-party script 124 due to changes made to the script by its publisher, or changes made by an attacker that compromised the script. For example, an attacker may compromise a script by either directly adding the malicious web code to the script, or adding a reference to malicious web code that obtains the malicious web code from an external source. In some cases, a first-party script 118 becomes compromised because it refers to a third-party script 124 that becomes malicious, either due to the other script's publisher or an attacker. In some cases, a third-party script 124 becomes compromised because it refers to another third-party script 124 that becomes malicious, either due to the other script's publisher or an attacker.

Some embodiments are described herein with respect to one third-party server system 122 and/or one third-party script 124 for ease of explanation. A web page 116 may refer to multiple third-party scripts 124 hosted by one or multiple third-party server systems 122 without departing from the spirit and the scope of the disclosure. Furthermore, a third-party script 124 at one third-party server system 122 may refer to a third-party script 124 at another third-party server system 122.

Security Server System

The security server system 140 detects malicious scripts (e.g. compromised first-party scripts 118 and/or third-party scripts 124) in a web page 116. In some embodiments, the security server system 140 is operated by a security company on behalf of one or more customers that operate one or more web server systems 112. The security server system 140 distinguishes legitimate scripts from malicious scripts based on script activity data collected at client computing devices 102. In some embodiments, the security server system 140 includes an instrumentation code component 132, a script activity processing component 134, and a script activity database component 136.

The security server system 140 and/or its components (e.g. instrumentation code component 132, script activity processing component 134, and/or script activity database component 136) as described herein are presented as individual components for ease of explanation; any action performed by or to one or more components of the security server system 140 may be considered performed by or to the security server system 140. The security server system 140 and/or its components may be implemented as one or more dependent or independent processes, and may be implemented on one or multiple computers; for example, a component may be implemented as a distributed system; alternatively and/or in addition, multiple instances of one or more components may be implemented. Furthermore, a component may be implemented fully and/or partially in one or multiple programs and/or processes, and two or more components shown may be implemented fully and/or partially in the same program and/or process.

Instrumentation Code

The instrumentation code component 132 provides instrumentation code for serving to the client computing device 102 with a web page 116. The instrumentation code executes when the browser 104 processes the web page 116 at the client computing device 102. In some embodiments, the instrumentation code is added to the web page 116 in a manner that causes the instrumentation code to load and execute before any script/s (e.g. first-party script 118, third-party script 124) are processed.

When the instrumentation code executes at the client computing device 102, the instrumentation code collects script activity data and sends the script activity data to the security server system 140. The script activity data includes data describing actions taken when a script executes at the client computing device 102. Script activity data is described in greater detail hereinafter.

The instrumentation code may be provided in different formats. For example, the instrumentation code may include JavaScript code, and/or other web code that executes in a browser 104 at the client computing device 102. In some embodiments, the instrumentation code includes inline JavaScript code within the web page 116. Inline JavaScript code appears directly in a web page 116 document.

In some embodiments, the instrumentation code component 132 provides different instrumentation code in different situations. For example, the instrumentation code component 132 may provide different versions of the instrumentation code to clients of different web server systems 112. In some embodiments, the instrumentation code component 132 provides different versions of the instrumentation code for different client computing devices 102. For example, different instrumentation code versions may be provided when client computing devices 102 are run different browsers, operating systems, or other software (including different versions thereof), or when the security server system 140 determines that client computing devices 102 pose a different amount or type of security risk.

Script Activity Data

Script activity data is generated by instrumentation code received with a web page 116 when the instrumentation code executes at a client computing device 102. When a script (e.g. first-party script 118, third-party script 124) is referenced by the web page 116, the browser 104 obtains and executes the script at the client computing device 102. The script activity data describes the execution of script in the context of the browser 104 and the web page 116. For example, if the third-party script includes a function call that operates on a specific web page element, the script activity data may include one or more pieces of data describing the interaction, such as a domain of the script, the URL of the script, the function call made by the script, the web page element, and/or other pieces of data describing the execution of the function call.

The instrumentation code may collect particular types of script activity data relevant to determining whether a script is malicious. In some embodiments, the script activity data describes particular function calls initiated by the script that have the potential to collect sensitive data and/or transmit sensitive data to a third-party server system 122. When the script is a third-party script 124, the third-party server system 122 that receives sensitive data from the third-party script 124 may be the same or different from the third-party server system 122 that hosts the third-party script 124.

The script activity data may include data describing interactions between a script and one or more Web Application Programming Interfaces (APIs). Web APIs are a collection of software interfaces that extend the functionality of a browser 104. A browser 104 typically includes a set of Web APIs to provide functionality such as Document Object Model (DOM) manipulation, network requests, audio/video functionality, and other functionality. For example, certain Web API interfaces may enable the script to access or otherwise manipulate one or more elements within the web page 1216. Specific non-limiting examples of script activity data describing interactions between a script and select Web API interfaces are described in greater detail hereinafter.

The security server system 140 may store script activity data received from client computing devices 102 in a script activity database component 136. As used herein, the term "database" refers to one or more data stores for at least one set of data. The data store/s may include one or more tangible and/or virtual data storage locations, which may or may not be physically co-located. A simple example of a database is a text file used to store information about a set of data. Another example of a database is one or more data stores that are maintained by a server that processes requests to perform operations on the database. In some embodiments, the script activity database component 136 includes a database management system (DBMS).

Detecting Changes in Script Activity

The script activity processing component 134 receives and processes script activity data collected at client computing devices 102 that were served the instrumentation code along with the web page 116. The script activity processing component 134 analyzes the script activity data to detect malicious scripts referenced in the web page 116. The script activity processing component 134 may evaluate script activity data related to a script (e.g. first-party script 118, third-party script 124) to determine whether the script engages in problematic behavior generally observed in malicious scripts. The security server system 140 may receive the script activity data directly from the client computing device 102 or indirectly via one or more other computer systems.

The script activity processing component 134 may determine that a script is malicious based on the determining that the script has started to perform new actions that it previously did not perform. In some embodiments, the script activity processing component 134 compares script activity data and prior script activity data to detect a malicious change in the script. The prior script activity data is generated by a prior instance of the instrumentation code served with the web page 116 to one or more other client computing devices 102. In some embodiments, the script activity processing component 134 obtains the script activity data from the script activity database component 136.

A script that performs legitimate functionality at a first time may become compromised at a later time. For example, a publisher of a third-party script 124 may intentionally modify the third-party script 124 to perform malicious actions. A third-party script 124 may also become compromised due to an attack on the hosting third-party server system 122. The attack may modify the third-party script 124, causing the third-party script 124 to perform malicious actions. An attack may modify the third-party script 124 by directly adding the malicious web code to the third-party script 124, by adding a reference to malicious web code to the third-party script 124, or by attacking another third-party script 124 already referenced by the third-party script 124.

An attack on a third-party script 124 may affect multiple web pages 116 that reference the third-party script 124. For example, if an attacker successfully compromises a library published by a third-party server system 122 that is used by multiple web server systems 112, then the compromised third-party script 24 may be served along with multiple web pages 116 hosted by multiple web server systems 112 that use the library.

By comparing the script activity data with prior script activity data, the script activity processing component 134 may distinguish legitimate script activity from malicious script activity. The web page 116 may reference one or more legitimate scripts (e.g. first-party script 118, third-party script 124) that legitimately access sensitive information. For example, a third-party server system 122 may provide a platform for handling web payments that includes third-party scripts 124 that require access to sensitive data to successfully handle web payments. Such third-party scripts 124 may also be evaluated using other security processes. By comparing the script activity data with prior script activity data, the script activity processing component 134 can identify new behavior that indicates that a malicious change was introduced, directly or by reference, to the script.

The prior script activity data may be in the same format or a different format than the script activity data. For example, the script activity database component 136 may include sets of script activity data collected from a plurality of client computing devices 102 for a plurality of web pages 116. In some embodiments, the script activity data is further processed. For example, script activity data collected for a web page 116 may be processed to generate one or more profiles for the web page 116, one or more profiles for each script operating in the context of the web page 116, or other processed data.

Script Activity Data—Web API Usage

The instrumentation code may monitor an executing script (e.g. first-party script 118, third-party script 124) to determine whether the script is using a particular Web API interface. For example, the instrumentation code may monitor a set of Web API interfaces that enable reading the contents of a form field of the web page 116. A user may enter sensitive data, such as a password or payment information into a form field of the web page 116 after the browser 104 processes, loads, and presents the web page 116 to the user on the client computing device 102. The instrumentation code may generate script activity data describing the usage, by the third party script 124, of Web API interfaces related to form fields. Such Web API interfaces may include, but are not limited to, one or more of HTMLInputElement, HTMLSelectElement, and HTMLTextAreaElement.

Script Activity Data—Web API Property Or Function

The instrumentation code may monitor an executing script (e.g. first-party script 118, third-party script 124) to determine whether the script accesses a particular aspect of a Web API interface, such as a function or a property of the interface. For example, the instrumentation code may detect when the executing script invokes a function and/or property of a Web API interface that reads the contents of a form field. The instrumentation code may generate script activity data describing the usage, by the third party script 124, of one or more Web API interface aspects that enable access to form field content. Such Web API interface aspects may include, but are not limited to, one or more of HTMLInputElement.value, HTMLSelectElement.value, and HTMLTextAreaElement.value.

Script Activity Data—Element Access

The instrumentation code may monitor an executing script (e.g. first-party script 118, third-party script 124) to determine whether the script accesses a particular element of the web page 116. For example, the instrumentation code may generate script activity data describing any attempt by a script to access a particular form field that is associated with sensitive data, such as, but not limited to, a password form field element or a credit card number form field element.

Script Activity Data—Event Object Access

The instrumentation code may monitor an executing script (e.g. first-party script 118, third-party script 124) to determine whether the script accesses event objects that may reveal sensitive data. Event objects represent events that occur when a user interacts with the web page 116 in the browser 104. For example, when a user enters sensitive data such as a password or payment information, KeyboardEvent objects may describe individual keystrokes. As another example, when a user enters a pin over a rendered number pad on a touch-enabled display, a set of TouchEvent objects may describe the interactions. The instrumentation code may generate script activity data describing the usage of Web API interfaces related to event objects by a script. Alternatively and/or in addition, the instrumentation code may generate script activity data describing the usage of Web API interfaces by a script to access event objects. Such Web API interfaces may include, but are not limited to, one or more of TouchEvent, PointerEvent, InputEvent, and KeyboardEvent.

Script Activity Data—Circumvention Techniques

The instrumentation code may monitor an executing script (e.g. first-party script 118, third-party script 124) to determine whether the script is attempting to circumvent one or more techniques described herein. For example, a script referenced in a web page 116 may attempt to prevent the instrumentation code from monitoring execution of one or more scripts. In some embodiments, the instrumentation code monitors a script to determine whether the script is attempting to execute web code in an iframe using the HTMLIFrameElement interface. When an iframe is created, an HTML document is created that is independent of the original web page 116. Thus, web code that is run in the iframe executes in a separate execution context that may not be accessible to the instrumentation code running in the execution context of the web page 116. The instrumentation code may generate script activity data describing the usage of one or more Web API interfaces usable to circumvent monitoring of a script in the web page context, such as, but not limited to, HTMLIFrameElement.

Script Activity Data—Network Requests

The instrumentation code may monitor a script (e.g. first-party script 118, third-party script 124) to determine whether the script is using a Web API interface associated with outgoing network requests. For example, the instrumentation code may monitor a set of Web API interfaces that enable outbound communications to a third-party server system 122. The instrumentation code may generate script activity data describing the usage of one or more Web API interfaces related to network requests by a script, such as XMLHttpRequest. Alternatively and/or in addition, the instrumentation code may generate script activity data describing the usage of one or more Web API interface methods to send an outgoing network request by a script, such as XMLHttpRequest.send( ).

Client-Side Runtime Example

Figure 2:
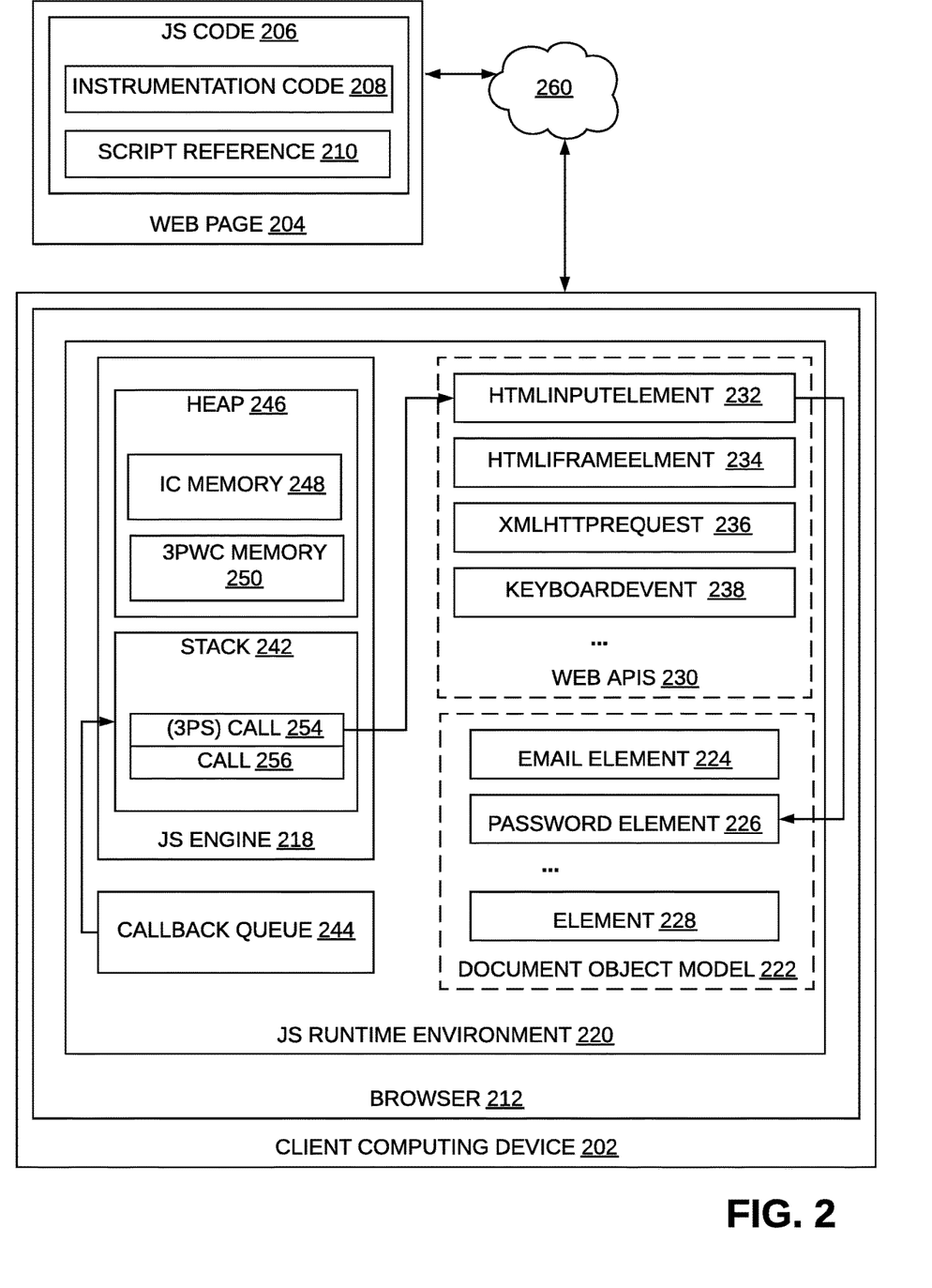
FIG. 2 illustrates a client computing device executing instrumentation code and a script referenced in a web page in an example embodiment.

FIG. 2 illustrates a client computing device executing instrumentation code and a script (e.g. first-party script 118, third-party script 124) referenced in a web page in an example embodiment. A user of the client computing device 202 may request a web page 204 using the browser 212 on a client computing device 202. The browser 212 processes the web page 204, such as by processing HTML instructions included in the web page 204. The web page 204 may include one or more sets of instructions or data, such as but not limited to HTML, CSS, and/or JavaScript code 206.

The JavaScript Engine 218 interprets and executes the JavaScript code 206 in a JavaScript runtime environment 220 embedded in the browser 212. As used herein, the term "runtime" refers to a time during which a program is running, such as when the browser 202 loads the web page 204 and when a user is able to interact with the web page 204 using the browser 202. One or more embodiments are described herein with respect to JavaScript code that is processed by a JavaScript engine 218 in a JavaScript runtime environment 220 without limiting the described techniques to a particular language.

When the browser 212 processes the web page 204, the browser 212 creates a Document Object Model (DOM) 222 that represents the web page 204 as a tree structure of web page elements 224-228. The DOM 212 may serve as an interface between the JavaScript code 206 and the web page 204. For example, JavaScript code 206 may use the DOM 212 to manipulate and perform operations on the elements 224-228 of the web page 204. When the browser 212 encounters JavaScript code 206 in the web page 204, the JavaScript engine 218 interprets and executes the JavaScript code 206.

The web page 204 includes instrumentation code 208 provided by a security server system (e.g. security server system 140). When the instrumentation code 208 executes, the instrumentation code 208 monitors referenced scripts that also execute in the browser 212. In some embodiments, the instrumentation code 208 includes inline JavaScript code. When the browser 212 encounters the instrumentation code 208 while processing the web page 204, the JavaScript engine 218 interprets and executes the instrumentation code 208. The instrumentation code 208 may generate functions and/or variables that occupy memory 248 allocated for the instrumentation code 208 in the heap 246.

The web page 204 includes a reference 210 to a script (e.g. first-party script 118, third-party script 124) that includes JavaScript code. The reference 210 may specify a URL that the browser 212 uses to request the script over the Internet 260. The JavaScript engine 218 interprets and executes the JavaScript code in the script. The script may generate functions and/or variables that occupy memory 250 allocated for the script in the heap 246. The instrumentation code 208 executes before the script, and is able to monitor all steps in the execution of the script.

The JavaScript engine 218 includes a stack 242 and a callback queue 244. The stack 242 is a data structure for storing JavaScript instructions to be immediately executed, such as function calls 254-256. Items on the stack 242 are immediately processed in a last-in, first-out (LIFO) order until the stack 242 is empty. Asynchronous instructions which are not for immediate execution are added to the callback queue 244 rather than the stack 242. For example, an event listener associated with an element 224-228 may trigger event-driven instructions, which are added to the callback queue 244. When the stack 242 is empty, items in the callback queue 244 are processed in a first-in, first-out (FIFO) order by pushing the first item into the stack 242 for immediate execution. Thus, both immediately-executed instructions and asynchronous instructions move through the stack 242 to be processed.

In some embodiments, the instrumentation code 208 operates by monitoring the stack 242. For example, the instrumentation code 208 may monitor the stack to detect when the script makes a call 254 to an interface of the Web APIs 230 that accesses sensitive data. For example, the instrumentation code 208 may generate and transmit script activity data when it detects that the script uses the HTMLInputElement 232 interface to access a password form field element 226.

The instrumentation code 208 may use the script activity data to detect new behavior that indicates that a malicious change was introduced. For example, the instrumentation code 208 may detect element access, event object access, circumvention techniques, and/or network requests. In some embodiments, the instrumentation code 208 detects particular combinations of actions previously not observed. The instrumentation code 208 may flag script behavior that includes a combination of element access and network requests by the script. For example, the instrumentation code 208 may flag script behavior when it detects that a script that previously accessed a form field begins to invoke network APIs that potentially exfiltrate data.

In some embodiments, the instrumentation code 208 operates by overriding one or more Web API interfaces 232-238. For example, the instrumentation code 208 may override one or more interfaces 232-238 of the Web APIs 230 that are associated with malicious script operation. As used herein, overriding an interface involves overriding one or more functions, properties, or other aspects of the interface. For example, the instrumentation code 208 may override the HTMLInputElement 232 interface such that when the script makes the call 254 involving the HTMLInputElement 232 interface and the password form field element 226, the instrumentation code 208 is able to intercept the call 254, collect script activity data, and invoke the intended call 254 to the HTMLInputElement 232 interface. When the instrumentation code 208 overrides one or more aspects of an interface 232-238, the instrumentation code 208 handles both legitimate script usage and malicious script usage of the overridden aspect/s of the interface 232-238. One or more functions, properties, and/or data structures for overriding the HTMLInputElement 232 interface may exist in the instrumentation code memory 248 in the heap 246.

Threat Response Action

When a security server system (e.g. security server system 140) determines that a web page (e.g. web page 116) is compromised, the security server system may perform a threat response action. For example, the threat response action may include notifying a publisher of the web page that its web page is compromised. The notification may include data about the malicious script (e.g. first-party script 118, third-party script 124) and/or suggested remedial actions to be taken by the publisher.

In some embodiments, the security server system may perform a threat response action that affects the ability of the malicious script to interact with the web page at the client computing device. For example, the security server system may provide threat response code for serving to a client computing device with a requested web page that affects the functionality of the malicious script within the requested web page.

Figure 3:
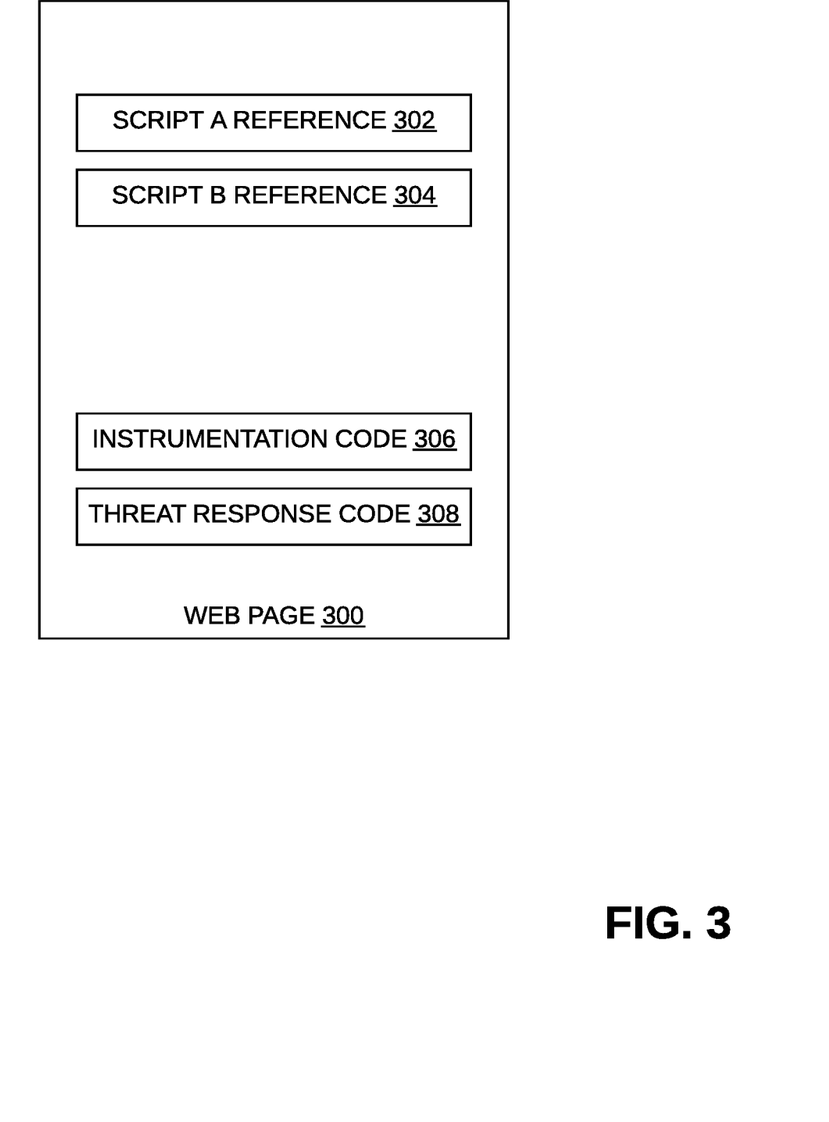
FIG. 3 illustrates a web page with instrumentation code and threat response code in an example embodiment.

FIG. 3 illustrates a web page with instrumentation code and threat response code in an example embodiment. The web page 300 includes a reference 302 to Script A and a reference 304 to Script B. Based on the analysis of script behavior data and prior script behavior data, Script A has been identified as a malicious script. The web page 300 is served to one or more client computing devices (e.g. client computing device 102) after Script A has been identified as a malicious script.

The web page 300 includes instrumentation code 306 to continue monitoring script execution at the client computing device when a script referenced by the web page is executed. For example, the instrumentation code 306 may continue to monitor the execution of Script A and Script B in the execution context of the web page 300.

The web page 300 includes threat response code 308. When executed, the threat response code 308 affects the ability of Script A to perform malicious actions. The threat response code 308 may limit the functionality of Script A using one or more techniques, including but not limited to the example techniques described hereinafter.

In some embodiments, the threat response code 308 operates to block a browser (e.g. browser 212) from loading Script A when the corresponding reference 302 is processed. In this case, the web code in Script A is never executed in the browser.

In some embodiments, the threat response code 308 operates to block Script A from using one or more Web API interfaces at the client computing device. For example, if it was previously determined that Script A started to use the HTMLInputElement interface (e.g. HTMLInputElement interface 232) inappropriately, the threat response code 308 may operate to block Script A from using the HTMLInputElement interface.

In some embodiments, the threat response code 308 operates to block Script A from accessing one or more elements of the web page 300 one at the client computing device. For example, if it was previously determined that Script A accessed a password form field element (e.g. password element 226) inappropriately using the HTMLInputElement interface, the threat response code 308 may operate to block Script A from using the HTMLInputElement interface to access the password form field element. Alternatively and/or in addition, the threat response code may operate to block Script A from accessing the password form field element using any Web API interface.

In some embodiments, the threat response code 308 operates to block Script A from initiating one or more network requests at the second client computing device. For example, if it was previously determined that Script A transferred sensitive data to a third-party server (e.g. third-party server system 122), the threat response code 308 may operate to block Script A from transferring data to the specified third-party server. The threat response code 308 may block outgoing network requests initiated by Script A to a particular third-party server. In some embodiments, the threat response code 308 operates to block any outgoing network request initiated by Script A. In some embodiments, the threat response code 308 blocks Script A from initiating outbound network requests to third-party servers if it has determined that Script A is malicious for any reason.

In some embodiments, the instrumentation code 306 overrides one or more interfaces (e.g. interfaces 232-238) of Web APIs supported by a browser. The threat response code 308 may use the overriding functionality in the instrumentation code 306 to block one or more function calls from Script A.

In some embodiments, when the security server system (e.g. security server system 140) determines that a particular third-party script 124 is malicious, the finding affects other third-party scripts belonging to the same domain as the malicious third-party script. In some embodiments, when the security server system (e.g. security server system 140)

determines that a particular third-party script 124 is malicious based on script activity data collected with respect to a first web page, the finding affects other web pages, including other web pages hosted by other web server systems.

Example System Architectures

A security server system (e.g. security server system 140) may be positioned in different network configurations with respect to client computing devices (e.g. client computing devices 102) and a web server system (e.g. web server system 112). For example the security server system may be deployed in an in-line configuration, an out-of-band configuration, or another configuration.

In an in-line security server configuration, a security server system may act as a reverse proxy server to a web server system by intercepting one or more communications between the client computing device/s and the web server system. As a reverse proxy server, the security server system retrieves one or more resources from the web server system and forwards the resources to the web server system. To the client computing devices, the resources appear to originate from the web server system. In some embodiments, when a client computing device requests a web page, the security server system retrieves the web page from the web server system, adds instrumentation code to the web page, and provides the instrumented web page to the client computing device.

In an out-of-band security server configuration, requests from the client computing devices are transmitted directly to the web server system. The web server system may communicate with the security server system to perform one or more security functions. For example, the security server system may provide the instrumentation code to the web server system so that the web server system can generate the instrumented web page before responding to the request for the web page.

Example Processes

Figure 4:
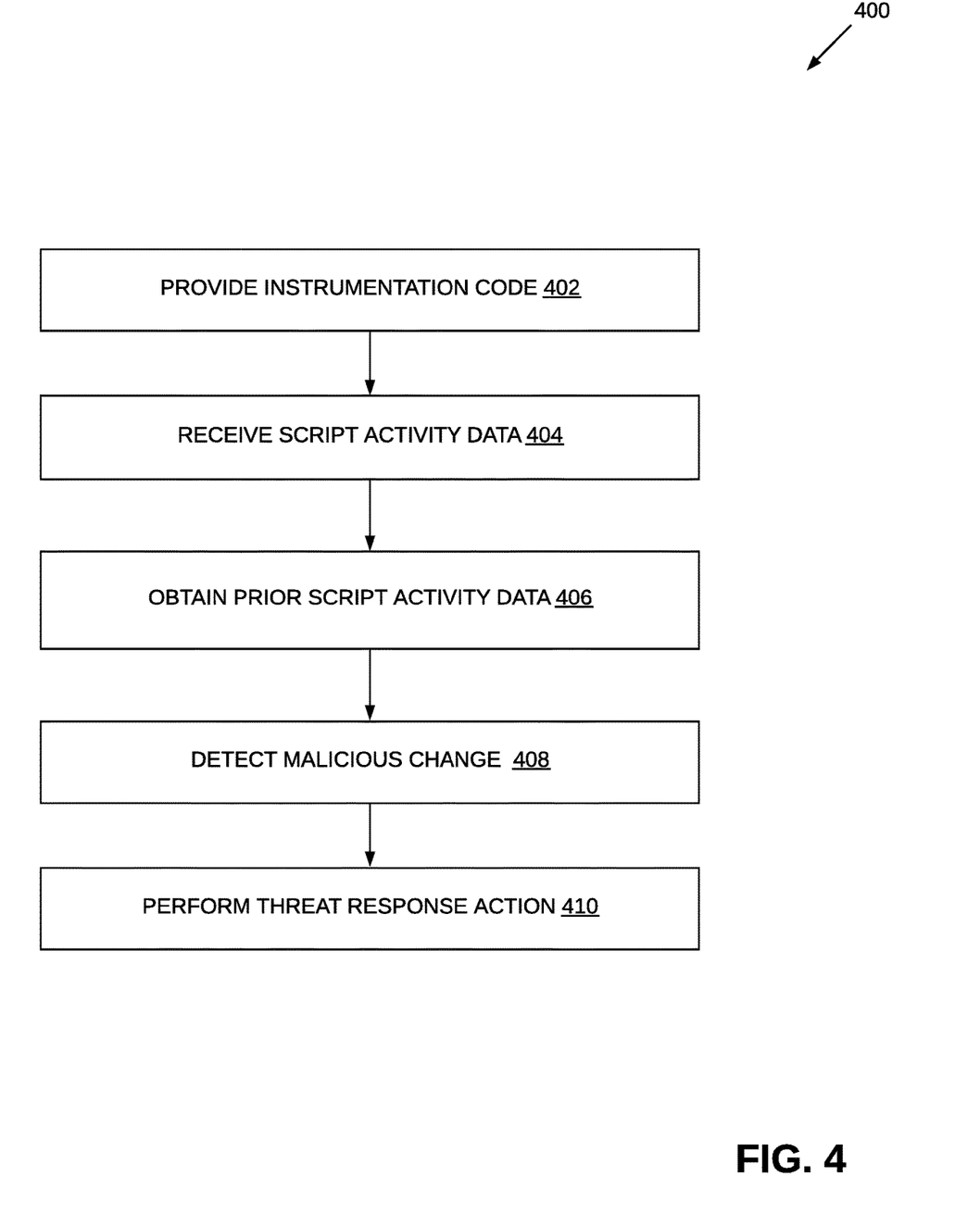
FIG. 4 is a flow diagram of a process for detecting a malicious script in a web page in an example embodiment.

FIG. 4 is a flow diagram of a process for detecting a malicious script in a web page in an example embodiment. Process 400 may be performed by one or more computing devices and/or processes thereof. For example, one or more blocks of process 400 may be performed by a computer system, such as but not limited to the computer system 500 of FIG. 5. In some embodiments, one or more blocks of process 400 are performed by a security server system, such as but not limited to security server system 140 of FIG. 1. Process 400 will be described with respect to security server system 140, but is not limited to performance by security server system 140.

At block 402, the security server system 140 provides instrumentation code for serving to a client computing device with a web page requested by the client computing device. The instrumentation code is configured to monitor web code execution at the client computing device when a script referenced by the web page is processed. The script may be a first-party script or third-party script.

At block 404, the security server system 140 receives script activity data generated by the instrumentation code at the client computing device. The script activity data describes one or more script actions detected by the instrumentation code. In some embodiments, the script activity data describes particular function calls that have the potential to collect sensitive data and/or transmit sensitive data to a third-party.

At block 406, the security server system 140 obtains prior script activity data generated by a prior instance of the instrumentation code that was served with the web page to one or more other client computing devices.

At block 408, the security server system 140 detects a malicious change in the script based on comparing the script activity data and the prior script activity data. In some embodiments, the security server system 140 determines that a script is malicious based on determining that the script has started to perform new actions that it previously did not perform.

At block 410, the security server system 140 performs a threat response action in response to detecting the malicious change in the script. The threat response action may include notifying a publisher of the web page that the web page is compromised. In some embodiments, the security server system 140 may perform a threat response action that affects the ability of the malicious script to interact with the web page at the client computing device. For example, the security server system 140 may provide threat response code for serving to a client computing device with a requested web page that affects the functionality of the malicious script within the requested web page.

Implementation Mechanisms—Hardware Overview

According to one embodiment, the techniques described herein are implemented by one or more special-purpose computing devices. The special-purpose computing devices may be hard-wired to perform one or more techniques described herein, including combinations thereof. Alternatively and/or in addition, the one or more special-purpose computing devices may include digital electronic devices such as one or more application-specific integrated circuits (ASICs) or field-programmable gate arrays (FPGAs) that are persistently programmed to perform the techniques. Alternatively and/or in addition, the one or more special-purpose computing devices may include one or more general-purpose hardware processors programmed to perform the techniques described herein pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, and/or any other device that incorporates hard-wired or program logic to implement the techniques.

Figure 5:
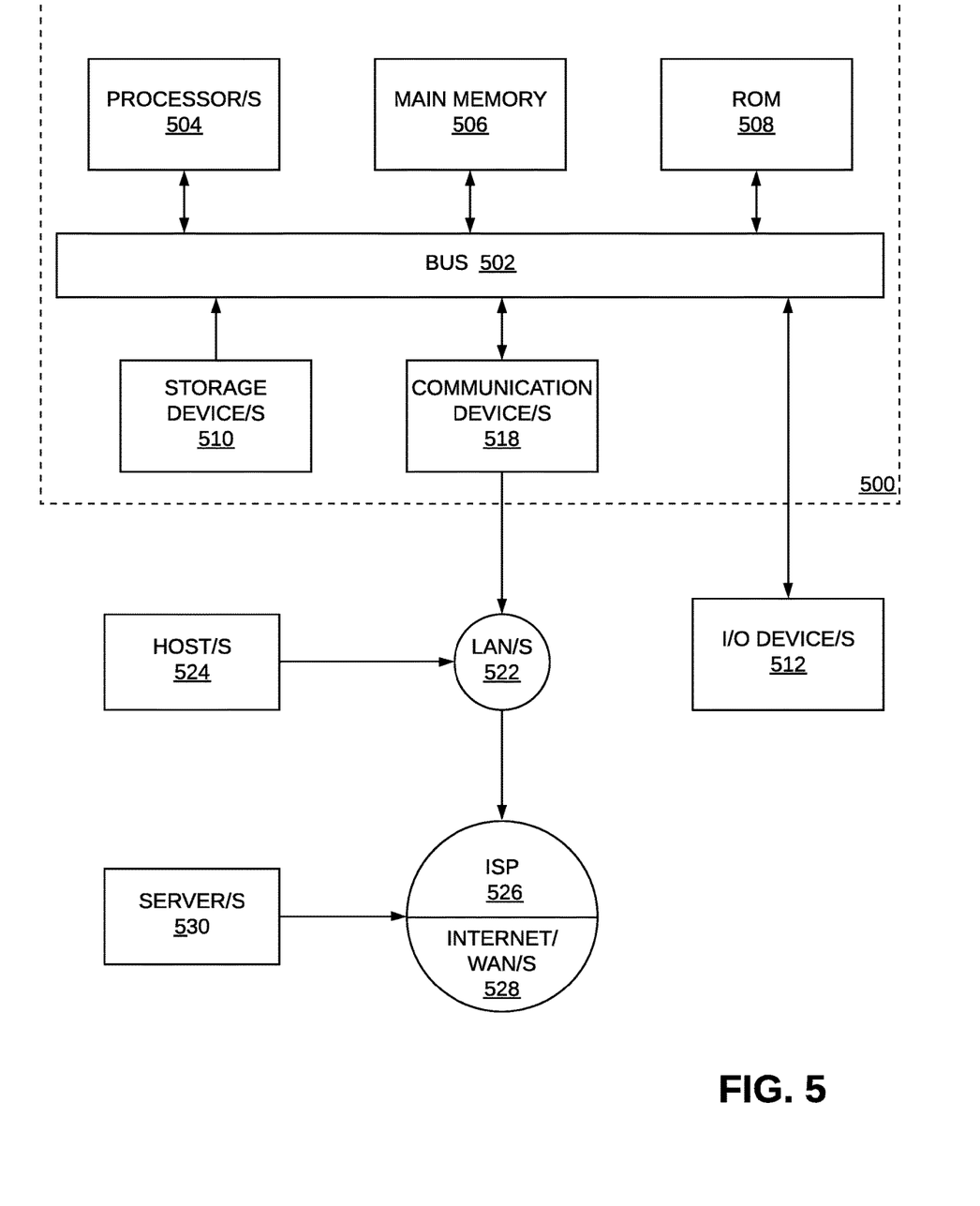
FIG. 5 is a block diagram that illustrates a computer system upon which an embodiment may be implemented.

FIG. 5 is a block diagram that illustrates a computer system 500 upon which an embodiment may be implemented. The computer system 500 includes a bus 502 or other communication mechanism for communicating information, and one or more hardware processors 504 coupled with bus 502 for processing information, such as computer instructions and data. The hardware processor/s 504 may include one or more general-purpose microprocessors, graphical processing units (GPUs), coprocessors, central processing units (CPUs), and/or other hardware processing units.

The computer system 500 also includes one or more units of main memory 506 coupled to the bus 502, such as random access memory (RAM) or other dynamic storage, for storing information and instructions to be executed by the processor/s 504. Main memory 506 may also be used for storing temporary variables or other intermediate information during execution of instructions to be executed by the processor/s 504. Such instructions, when stored in non-transitory storage media accessible to the processor/s 504, turn the computer system 500 into a special-purpose machine that is customized to perform the operations specified in the instructions. In some embodiments, main memory 506 may include dynamic random-access memory (DRAM) (including but not limited to double data rate synchronous dynamic random-access memory (DDR SDRAM), thyristor random-access memory (T-RAM), zero-capacitor (Z-RAM™)) and/or non-volatile random-access memory (NVRAM).

The computer system 500 may further include one or more units of read-only memory (ROM) 508 or other static storage coupled to the bus 502 for storing information and instructions for the processor/s 504 that are either always static or static in normal operation but reprogrammable. For example, the ROM 508 may store firmware for the computer system 500. The ROM 508 may include mask ROM (MROM) or other hard-wired ROM storing purely static information, programmable read-only memory (PROM), erasable programmable read-only memory (EPROM), electrically-erasable programmable read-only memory (EEPROM), another hardware memory chip or cartridge, or any other read-only memory unit.

One or more storage devices 510, such as a magnetic disk or optical disk, is provided and coupled to the bus 502 for storing information and/or instructions. The storage device/s 510 may include non-volatile storage media such as, for example, read-only memory, optical disks (such as but not limited to compact discs (CDs), digital video discs (DVDs), Blu-ray discs (BDs)), magnetic disks, other magnetic media such as floppy disks and magnetic tape, solid-state drives, flash memory, optical disks, one or more forms of non-volatile random-access memory (NVRAM), and/or other non-volatile storage media.

The computer system 500 may be coupled via the bus 502 to one or more input/output (I/O) devices 512. For example, the I/O device/s 512 may include one or more displays for displaying information to a computer user, such as a cathode ray tube (CRT) display, a Liquid Crystal Display (LCD) display, a Light-Emitting Diode (LED) display, a projector, and/or any other type of display.

The I/O device/s 512 may also include one or more input devices, such as an alphanumeric keyboard and/or any other keypad device. The one or more input devices may also include one or more cursor control devices, such as a mouse, a trackball, a touch input device, or cursor direction keys for communicating direction information and command selections to the processor 504 and for controlling cursor movement on another I/O device (e.g. a display). A cursor control device typically has at degrees of freedom in two or more axes, (e.g. a first axis x, a second axis y, and optionally one or more additional axes z), that allows the device to specify positions in a plane. In some embodiments, the one or more I/O device/s 512 may include a device with combined I/O functionality, such as a touch-enabled display.

Other I/O device/s 512 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information with the processor/s 504 over the bus 502.

The computer system 500 may implement the techniques described herein using customized hard-wired logic, one or more ASICs or FPGAs, firmware, and/or program logic which, in combination with the computer system causes or programs, causes computer system 500 to be a special-purpose machine. According to one embodiment, the techniques herein are performed by the computer system 500 in response to the processor/s 504 executing one or more sequences of one or more instructions contained in main memory 506. Such instructions may be read into main memory 506 from another storage medium, such as the one or more storage device/s 510. Execution of the sequences of instructions contained in main memory 506 causes the processor/s 504 to perform the process steps described herein. In alternative embodiments, hard-wired circuitry may be used in place of or in combination with software instructions.

The computer system 500 also includes one or more communication interfaces 518 coupled to the bus 502. The communication interface/s 518 provide two-way data communication over one or more physical or wireless network links 520 that are connected to a local network 522 and/or a wide area network (WAN), such as the Internet. For example, the communication interface/s 518 may include an integrated services digital network (ISDN) card, cable modem, satellite modem, or a modem to provide a data communication connection to a corresponding type of telephone line. Alternatively and/or in addition, the communication interface/s 518 may include one or more of: a local area network (LAN) device that provides a data communication connection to a compatible local network 522; a wireless local area network (WLAN) device that sends and receives wireless signals (such as electrical signals, electro-magnetic signals, optical signals or other wireless signals representing various types of information) to a compatible LAN; a wireless wide area network (WWAN) device that sends and receives such signals over a cellular network access a wide area network (WAN, such as the Internet 528); and other networking devices that establish a communication channel between the computer system 500 and one or more LANs 522 and/or WANs.

The network link/s 520 typically provide data communication through one or more networks to other data devices. For example, the network link/s 520 may provide a connection through one or more local area networks 522 (LANs) to one or more host computers 524 or to data equipment operated by an Internet Service Provider (ISP) 526. The ISP 526 provides connectivity to one or more wide area networks 528, such as the Internet. The LAN/s 522 and WAN/s 528 use electrical, electromagnetic, or optical signals that carry digital data streams. The signals through the various networks and the signals on the network link/s 520 and through the communication interface/s 518 are example forms of transmission media, or transitory media.

The term "storage media" as used herein refers to any non-transitory media that stores data and/or instructions that cause a machine to operate in a specific fashion. Such storage media may include volatile and/or non-volatile media. Storage media is distinct from but may be used in conjunction with transmission media. Transmission media participates in transferring information between storage media. For example, transmission media includes coaxial cables, copper wire and fiber optics, including traces and/or other physical electrically conductive components that comprise the bus 502. Transmission media can also take the form of acoustic or light waves, such as those generated during radio-wave and infra-red data communications.

Various forms of media may be involved in carrying one or more sequences of one or more instructions to the processor 504 for execution. For example, the instructions may initially be carried on a magnetic disk or solid-state drive of a remote computer. The remote computer can load the instructions into its main memory 506 and send the instructions over a telecommunications line using a modem. A modem local to the computer system 500 can receive the data on the telephone line and use an infra-red transmitter to convert the data to an infra-red signal. An infra-red detector can receive the data carried in the infra-red signal and appropriate circuitry can place the data on the bus 502. The bus 502 carries the data to main memory 506, from which the processor 504 retrieves and executes the instructions. The instructions received by main memory 506 may optionally be stored on the storage device 510 either before or after execution by the processor 504.

The computer system 500 can send messages and receive data, including program code, through the network(s), the network link 520, and the communication interface 518. In the Internet example, one or more servers 530 may transmit signals corresponding to data or instructions requested for an application program executed by the computer system 500 through the Internet 528, ISP 526, local network 522 and the communication interface/s 518. The received signals may include instructions and/or information for execution and/or processing by the processor/s 504. The processor/s 504 may execute and/or process the instructions and/or information upon receiving the signals by accessing main memory 506, or at a later time by storing them and then accessing them from the storage device/s 510.

OTHER ASPECTS OF DISCLOSURE

In the foregoing specification, embodiments are described with reference to specific details that may vary from implementation to implementation. Nevertheless, it will be understood that various modifications may be made without departing from the spirit and scope of the invention. The examples set forth above are provided to those of ordinary skill in the art as a complete disclosure and description of how to make and use the embodiments, and are not intended to limit the scope of what the inventor/inventors regard as their invention. Modifications of the above-described modes for carrying out the methods and systems herein disclosed that are obvious to persons of skill in the art are intended to be within the scope of the present disclosure and the following claims. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system comprising:
   one or more hardware processors;
   a memory coupled to the one or more hardware processors and storing one or more instructions which, when executed by the one or more hardware processors, cause the one or more hardware processors to:
   provide instrumentation code for serving to a client computing device with a web page requested by the client computing device, the instrumentation code configured to monitor web code execution at the client computing device when a script referenced by the web page is processed and generate script activity data when the instrumentation code detects script behavior that can exfiltrate data;
   receive the script activity data generated by the instrumentation code at the client computing device, the script activity data describing one or more script actions detected by the instrumentation code, wherein the one or more script actions include the script using a Web API interface that enables reading contents of a form field of the web page that is configured to receive data input by a user;
   obtain prior script activity data generated by a prior instance of the instrumentation code served with the web page to one or more other client computing devices;
   detect a malicious change in the script based on comparing the script activity data and the prior script activity data; and
   in response to detecting the malicious change in the script, perform a threat response action.

2. The computer system of claim 1, wherein the one or more script actions include the script using a Web API interface that accesses data from an event object or performs an outbound network request.

3. The computer system of claim 1, wherein detecting the malicious change includes detecting that the script:
   uses a new Web API interface in the script activity data compared to the prior script activity data,
   accesses a new form field in the script activity data compared to the prior script activity data,
   performs a new outbound network request in the script activity data compared to the prior script activity data, or
   accesses a new event object compared to the prior script activity data.

4. The computer system of claim 1, wherein the threat response action includes providing threat response code for serving to a second client computing device with the web page, the threat response code configured to performing a blocking action on the script.

5. The computer system of claim 4, wherein the blocking action includes at least one of: blocking the script from loading at the second client computing device;
   blocking the script from using one or more APIs at the second client computing device; blocking the script from accessing one or more elements of the web page at the second client computing device; and
   blocking the script from initiating one or more outbound network requests at the second client computing device.

6. A method comprising:
   providing instrumentation code for serving to a client computing device with a web page requested by the client computing device, the instrumentation code configured to monitor web code execution at the client computing device when a script referenced by the web page is processed and generate script activity data when the instrumentation code detects script behavior that can exfiltrate data;
   receiving the script activity data generated by the instrumentation code at the client computing device, the script activity data describing one or more script actions detected by the instrumentation code, wherein the one or more script actions include the script using a Web API interface that enables reading contents of a form field of the web page that is configured to receive data input by a user;
   obtaining prior script activity data generated by a prior instance of the instrumentation code served with the web page to one or more other client computing devices;
   detecting a malicious change in the script based on comparing the script activity data and the prior script activity data; and
   in response to detecting the malicious change in the script, performing a threat response action,
   wherein the method is performed by one or more computing devices.

7. The method of claim 6, wherein the one or more script actions include the script using a Web API interface that accesses data from an event object or performs an outbound network request.

8. The method of claim 6, wherein detecting the malicious change includes detecting that the script:
  uses a new Web API interface in the script activity data compared to the prior script activity data,
  accesses a new form field in the script activity data compared to the prior script activity data,
  performs a new outbound network request in the script activity data compared to the prior script activity data, or
  accesses a new event object compared to the prior script activity data.

9. The method of claim 6, wherein the threat response action includes providing threat response code for serving to a second client computing device with the web page, the threat response code configured to performing a blocking action on the script.

10. The method of claim 9, wherein the blocking action includes at least one of:
  blocking the script from loading at the second client computing device;
  blocking the script from using one or more APIs at the second client computing device;
  blocking the script from accessing one or more elements of the web page at the second client computing device; and
  blocking the script from initiating one or more outbound network requests at the second client computing device.

11. A network traffic management system, comprising one or more traffic management apparatuses, client devices, or server devices, the network traffic management system comprising memory comprising programmed instructions stored thereon and one or more processors configured to be capable of executing the stored programmed instructions to:
  provide instrumentation code for serving to a client computing device with a web page requested by the client computing device, the instrumentation code configured to monitor web code execution at the client computing device when a script referenced by the web page is processed and generate script activity data when the instrumentation code detects script behavior that can exfiltrate data;
  receive the script activity data generated by the instrumentation code at the client computing device, the script activity data describing one or more script actions detected by the instrumentation code, wherein the one or more script actions include the script using a Web API interface that enables reading contents of a form field of the web page that is configured to receive data input by a user;
  obtain prior script activity data generated by a prior instance of the instrumentation code served with the web page to one or more other client computing devices;
  detect a malicious change in the script based on comparing the script activity data and the prior script activity data; and
  in response to detecting the malicious change in the script, perform a threat response action.

12. The network traffic management system of claim 11, wherein the one or more script actions include the script using a Web API interface that accesses data from an event object or performs an outbound network request.

13. The network traffic management system of claim 11, wherein detecting the malicious change includes detecting that the script:
  uses a new Web API interface in the script activity data compared to the prior script activity data,
  accesses a new form field in the script activity data compared to the prior script activity data,
  performs a new outbound network request in the script activity data compared to the prior script activity data, or
  accesses a new event object compared to the prior script activity data.

14. The network traffic management system of claim 11, wherein the threat response action includes providing threat response code for serving to a second client computing device with the web page, the threat response code configured to performing a blocking action on the script.

15. The network traffic management system of claim 11, wherein the blocking action includes at least one of:
  blocking the script from loading at the second client computing device;
  blocking the script from using one or more APIs at the second client computing device;
  blocking the script from accessing one or more elements of the web page at the second client computing device; and
  blocking the script from initiating one or more outbound network requests at the second client computing device.

16. A network traffic manager apparatus, comprising memory comprising programmed instructions stored in the memory and one or more processors configured to be capable of executing the programmed instructions stored in the memory to:
  provide instrumentation code for serving to a client computing device with a web page requested by the client computing device, the instrumentation code configured to monitor web code execution at the client computing device when a script referenced by the web page is processed and generate script activity data when the instrumentation code detects script behavior that can exfiltrate data;
  receive the script activity data generated by the instrumentation code at the client computing device, the script activity data describing one or more script actions detected by the instrumentation code, wherein the one or more script actions include the script using a Web API interface that enables reading contents of a form field of the web page that is configured to receive data input by a user;
  obtain prior script activity data generated by a prior instance of the instrumentation code served with the web page to one or more other client computing devices;
  detect a malicious change in the script based on comparing the script activity data and the prior script activity data; and
  in response to detecting the malicious change in the script, perform a threat response action.

17. The device as set forth in claim 16, wherein the one or more script actions include the script using a Web API interface that accesses a form field, accesses data from an event object or performs an outbound network request.

18. The device as set forth in claim 16, wherein detecting the malicious change includes detecting that the script:
  uses a new Web API interface in the script activity data compared to the prior script activity data, accesses a new form field in the script activity data compared to the prior script activity data, performs a new outbound network request in the script activity data compared to the prior script activity data, or accesses a new event object compared to the prior script activity data.

19. The device as set forth in claim 16, wherein the threat response action includes providing threat response code for serving to a second client computing device with the web page, the threat response code configured to performing a blocking action on the script.

20. The device as set forth in claim 19, wherein the blocking action includes at least one of: blocking the script from loading at the second client computing device;

blocking the script from using one or more APIs at the second client computing device;

blocking the script from accessing one or more elements of the web page at the second client computing device; and blocking the script from initiating one or more outbound network requests at the second client computing device.

* * * * *